(12) United States Patent
Emura et al.

(10) Patent No.: US 9,452,807 B2
(45) Date of Patent: Sep. 27, 2016

(54) BICYCLE FRONT DERAILLEUR WITH MOUNTING STRUCTURE

(71) Applicant: Shimano Inc., Sakai, Osaka (JP)

(72) Inventors: Atsuhiro Emura, Sakai (JP); Kenkichi Inoue, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/566,718

(22) Filed: Dec. 11, 2014

(65) Prior Publication Data

US 2016/0167741 A1 Jun. 16, 2016

(51) Int. Cl.
*B62K 19/30* (2006.01)
*B62M 9/135* (2010.01)
*B62M 9/136* (2010.01)

(52) U.S. Cl.
CPC .............. *B62M 9/135* (2013.01); *B62K 19/30* (2013.01); *B62M 9/136* (2013.01)

(58) Field of Classification Search
CPC ...... B62M 9/135; B62M 9/136; B62K 19/30
See application file for complete search history.

(56) References Cited

U.S. PATENT DOCUMENTS

| | | | | |
|---|---|---|---|---|
| 5,460,396 A * | 10/1995 | Sutter | ................... | B62K 25/30 280/261 |
| 5,846,148 A * | 12/1998 | Fujii | ...................... | B62M 9/135 474/80 |
| 6,612,950 B2 * | 9/2003 | Nanko | ................... | B62M 9/135 474/80 |
| 7,867,118 B2 * | 1/2011 | Yamamoto | ............. | B62M 9/136 474/80 |
| 8,075,009 B2 * | 12/2011 | Cocalis | ................... | B62K 25/28 280/284 |
| 8,770,608 B1 | 7/2014 | Chamberlain | | |
| 2006/0068955 A1 * | 3/2006 | Oi | .......................... | B62M 9/135 474/78 |

FOREIGN PATENT DOCUMENTS

EP 1867563 B1 12/2010

* cited by examiner

*Primary Examiner* — Tony Winner
*Assistant Examiner* — Marlon A Arce

(57) ABSTRACT

A bicycle front derailleur includes a mounting member, a chain guide, and a linkage assembly that pivotally couples the mounting member to the chain guide. The mounting member is configured to be mounted to a first frame member of a bicycle frame. The first frame member is pivotally connected to a second frame member of the bicycle frame about a pivot axis. The mounting member includes an attachment portion through which a fixing bolt for fixing the mounting member to the first frame member passes and includes an abutment configured to restrict rotation of the mounting member around the fixing bolt. The attachment portion is located on a front side of the pivot axis when the mounting member is mounted to the first frame member. The bicycle frame includes a structure for engaging and supporting the mounting member.

11 Claims, 8 Drawing Sheets

US 9,452,807 B2

BICYCLE FRONT DERAILLEUR WITH MOUNTING STRUCTURE

BACKGROUND OF THE INVENTION

The invention generally relates to a bicycle front derailleur and a bicycle frame especially adapted to be equipped with a rear suspension. More specifically, the present invention relates to a bicycle front derailleur that is designed to be attached to a pivotal frame member, called a swingarm, including a chainstay, which is pivotal with respect to another frame member, such as a seat tube.

Front derailleurs are typically mounted to a bicycle frame near the bottom bracket hanger. However, in some frame configurations of modern bicycles, this is a crowded location, and it is sometimes difficult to avoid interference between a mounting member to mount the front derailleur and other parts. For example, in a frame configuration in which the chain stays pivot with respect to a seat tube having the bottom bracket hanger, there may be interference between the mounting member of the front derailleur and a pivot joint of the chain stays.

SUMMARY OF THE INVENTION

A bicycle front derailleur includes a mounting member configured to be mounted to a first frame member of a bicycle frame. The first frame member is pivotally connected to a second frame member of the bicycle frame about a pivot axis. The derailleur further includes a chain guide and a linkage assembly that pivotally couples the mounting member to the chain guide. The mounting member includes an attachment portion through which a fixing bolt for fixing the mounting member to the first frame member passes and includes an abutment configured to restrict rotation of the mounting member around the fixing bolt by abutting the first frame member. The attachment portion is configured to be located on a front side of the pivot axis when the mounting member is mounted to the first frame member.

In another aspect, the abutment is integrally formed with the mounting member.

In another aspect, the first frame member is a chain stay of the bicycle frame, and the second frame member is a seat tube of the bicycle frame.

In another aspect, the attachment portion is an elongated opening extending in a longitudinal direction of the second frame member when the mounting member is mounted to the first frame member.

In another aspect, the abutment is one of a protrusion and an elongated recess, the first frame member includes the other of the protrusion and the elongated recess, the protrusion and the elongated recess are configured to engage with one another, and the elongated recess extends in a longitudinal direction of the second frame member when the mounting member is attached to the first frame member.

In another aspect, the abutment is configured to be located on a front side of the pivot axis when the mounting member is mounted to the first frame member.

In another aspect, the mounting member is configured to be mounted to a connecting portion of the first frame member.

In another aspect, the mounting member includes a reinforcement portion, which is located on a rear side of the attachment portion.

In another aspect, the reinforcement portion is formed without any portion that allows a fixing bolt passing through to fix the mounting member to the first frame member.

In another aspect, attachment portion extends below the chain guide.

In another aspect, a bicycle front derailleur includes a mounting member configured to be mounted to a first frame member of a bicycle frame. The first frame member is pivotally connected to a second frame member of the bicycle frame about a pivot axis. The second frame member includes a bottom bracket hanger to which a bottom bracket is attached. The derailleur further includes a chain guide and a linkage assembly that pivotally couples the mounting member to the chain guide. The mounting member includes a first attachment portion through which a first fixing bolt for fixing the mounting member to the first frame member passes and includes a second attachment portion through which a second fixing bolt for fixing the mounting member to the first frame member passes. Both the first and second fixing bolts are configured to be located on a front side of the pivot axis, when the mounting member is mounted to the first frame member.

A bicycle frame includes a first frame member and a second frame member configured to be pivotally connected to the first frame member about a pivot axis. The first frame member includes a threaded hole through which a fixing bolt for fixing a mounting member of a bicycle front derailleur to the first frame member passes and includes an abutting portion configured to restrict rotation of the mounting member around the fixing bolt by abutting the mounting member of the bicycle front derailleur. The threaded hole is located on a front side of the pivot axis.

In another aspect, the first frame member is a chain stay of the bicycle frame, and the second frame member is a seat tube of the bicycle frame.

In another aspect, a bicycle frame comprises a second frame member and a first frame member configured to be pivotally connected to the second frame member about a pivot axis. The second frame member includes a bottom bracket hanger to which a bottom bracket is attached. The first frame member includes a first threaded hole through which a first fixing bolt for fixing a mounting member of a bicycle front derailleur to the first frame member passes and includes second threaded hole through which a second fixing bolt for fixing a mounting member of a bicycle front derailleur to the first frame member passes. The first and second threaded holes are located on a front side of the pivot axis. In another aspect, the first frame member is a chain stay of the bicycle frame, and the second frame member is a seat tube of the bicycle frame.

DESCRIPTION OF THE EMBODIMENTS

Figure 1:
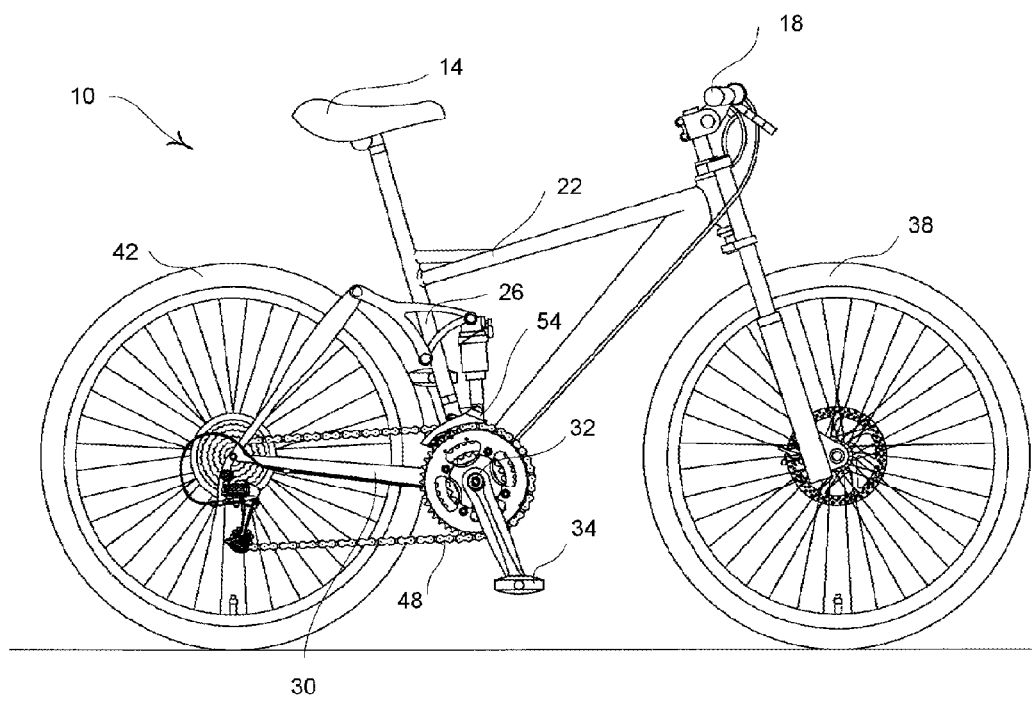
FIG. 1 is a side view of a bicycle to which the front derailleur of the present invention is attached.

FIG. 1 shows a bicycle 10 that includes a seat 14, handlebars 18, a frame 22, a seat tube 26, chain stays 30, a bottom bracket 32, pedals 34, a front wheel 38, a rear wheel 42, a chain 48, and a front derailleur 54. For reference purposes, the bicycle 10 includes a center plane 56 (See FIG. 3), which is perpendicular to an axis of the rear wheel 42, includes a center axis 58 of the seat tube 26 and extends in a longitudinal direction of the bicycle 10.

Figure 2:
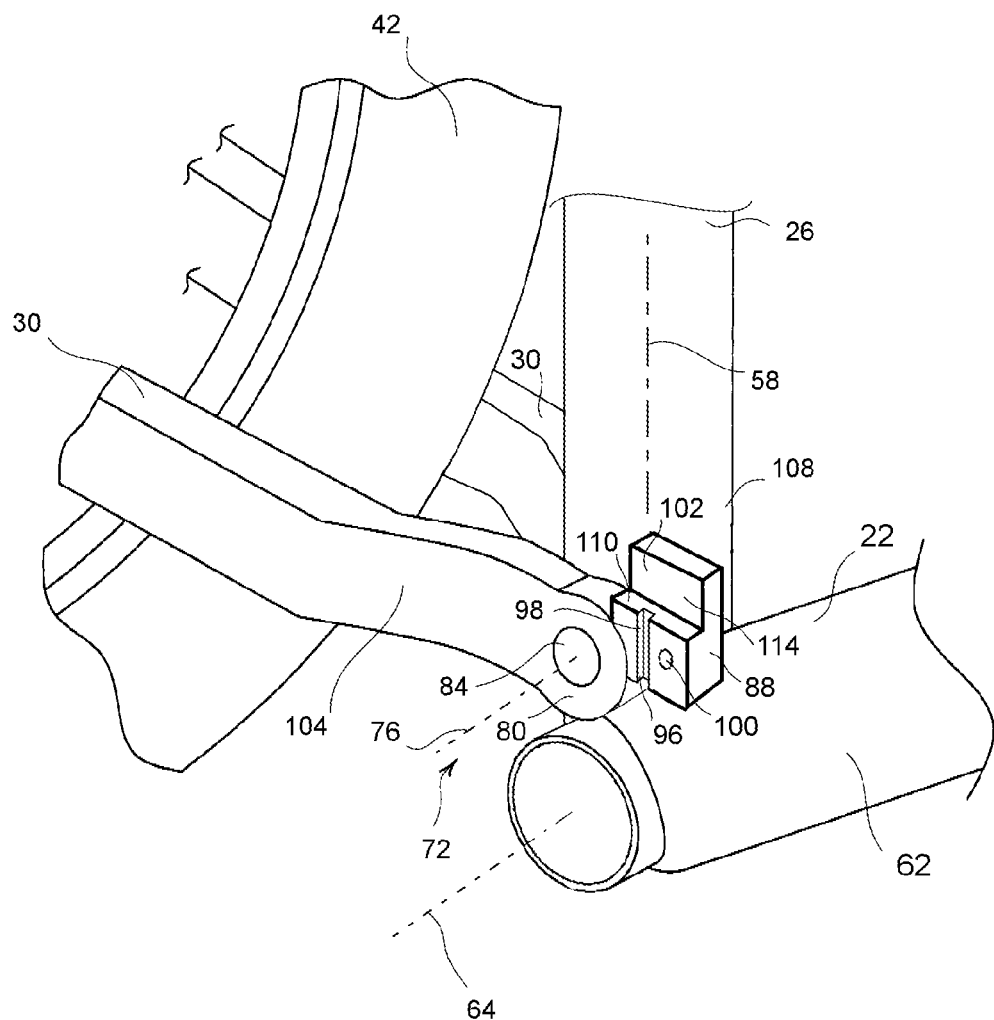
FIG. 2 is a partial diagrammatic perspective view of parts of the bicycle frame of the bicycle of FIG. 1.

FIG. 2 shows portions of the bicycle frame 22. In FIG. 2, the rear of the bicycle 10 is toward the left, and the front of the bicycle 10 is to the right. The generally vertical seat tube 26 includes a bottom bracket hanger 60, to which the bottom bracket 32 is attached. The bottom bracket hanger 60 connects the seat tube 26 and a down tube 62. The bottom bracket 32 rotates about a bottom bracket axis 64. In this embodiment, a pivot joint 72 is rigidly connected directly to the seat tube 26. However, the pivot joint 72 can be indirectly connected to the seat tube 26; for example, the pivot joint 72 can be located on a structure extending from the seat tube or the bottom bracket hanger 60. Connecting portions 80 of the chain stays 30 are located at the front ends of the chain stays 30 and surround a pivot pin 84 of the pivot joint 72. The pivot pin 84 is fixed securely to the second frame member 108 by welding or other secure fastening method. Thus, the pivot joint 72 pivotally supports the chain stays 30 with respect to the second frame member 108, which is the seat tube 26 in this embodiment. The chain stays 30 are pivotal about a pivot axis 76 of the pivot pin 84.

A mounting seat 88 is formed on one of the connecting portions 80. However, the mounting seat 88 can be formed on another portion of the chain stay 30 other than the connecting portions 80. The mounting seat 88 can be formed integrally with the corresponding chain stay 30 or attached to the chain stay 30 by a fastener or by welding. The mounting seat 88 is designed so that a mounting member 92 of the front derailleur 54 is attached to the mounting seat 88, which is described below.

In this embodiment, the mounting seat 88 includes an elongated recess 96 and a threaded hole 100, which are spaced apart in the longitudinal direction of the bicycle 10. The mounting seat 88 also includes an upper recess 102, which includes a first surface 110 and a second surface 114. In this embodiment, both the elongated recess 96 and the threaded hole 100 are located on a front side of the pivot axis 76 in the longitudinal direction of the bicycle 10. The elongated recess 96 forms an abutting portion 98, which is described below. This description sometimes refers to a first frame member 104 and a second frame member 108. In this embodiment, the first frame member 104 is one of the chain stays 30 of the bicycle frame 22, and the second frame member 108 is the seat tube 26 of the bicycle frame 22. However, the second frame member 108 is not limited to the seat tube 26. The second frame member 108 can be another frame member that is pivotally connected to the first frame member 104, which is one of the chain stays 30. Thus, the mounting member 92 is configured to be mounted to a connecting portion 80 of the first frame member 104.

Figure 3:
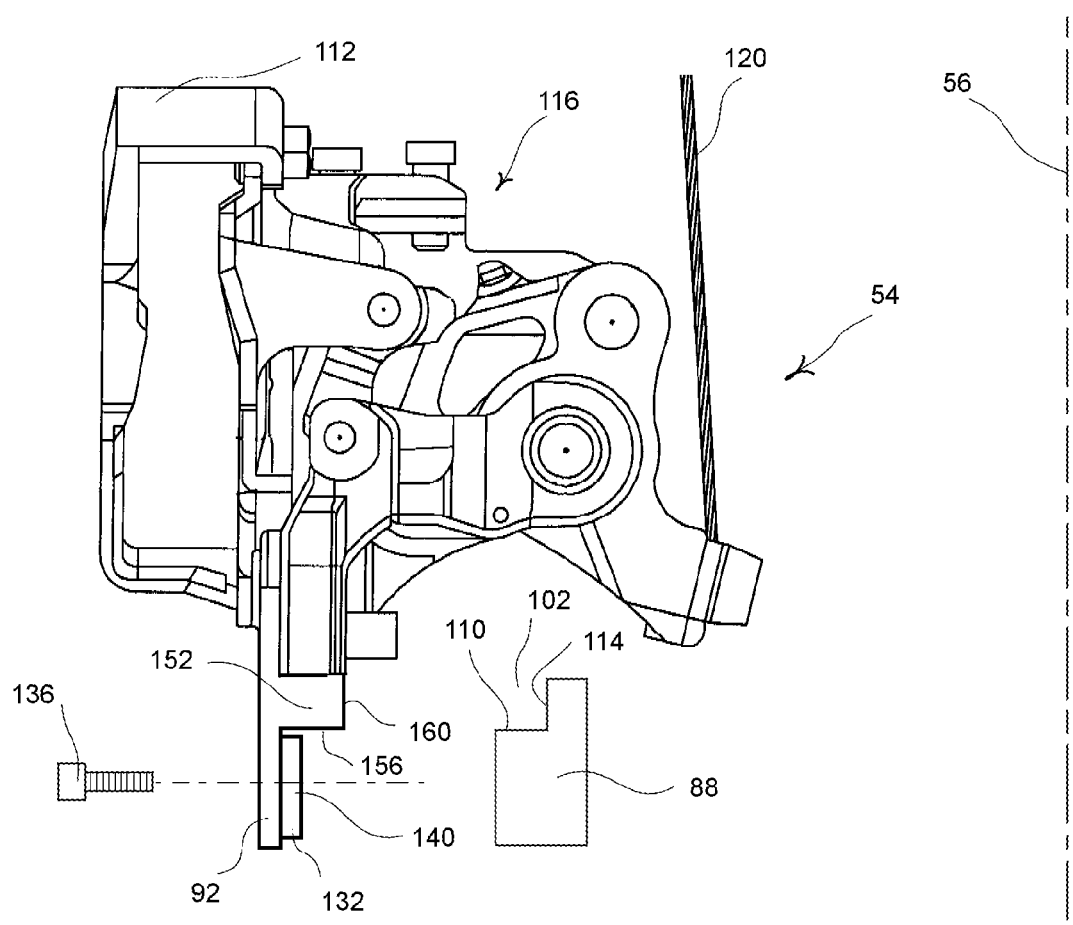
FIG. 3 is a front view of the front derailleur.

FIG. 3 illustrates the front derailleur 54 aligned with the mounting seat 88. The front derailleur 54 includes a chain guide 112, the mounting member 92, and a linkage assembly 116 that pivotally couples the mounting member 92 to the chain guide 112. The details of the linkage assembly 116 are well known and thus not described in detail. Basically, pulling movement of a control cable 120 causes the linkage assembly 116 to move the chain guide 112 to an extended position (away from the center plane 56 in FIG. 3). Releasing movement of the control cable 120 permits the chain guide 112 to return to a retracted position (toward the center plane 56) under the force of a return spring (not shown). The mounting member 92 remains stationary during movement of the chain guide 112 with respect to the first frame member 108 and serves as a fixed base for the front derailleur 54. A well-known shift controller (not illustrated) for pulling and releasing the control cable 120 is located on the handlebars 18, for example.

Figure 4:
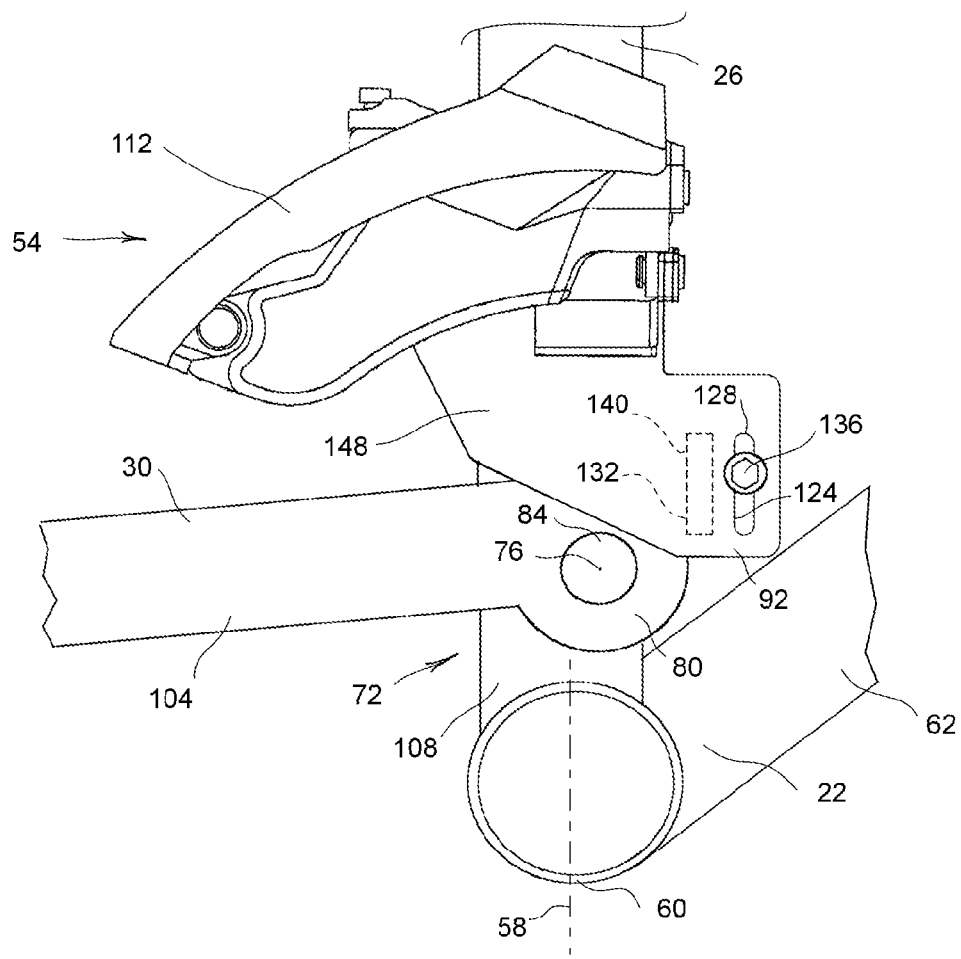
FIG. 4 is a diagrammatic side view of the front derailleur and parts of the bicycle frame to which it is attached.

In the illustrated embodiment of FIG. 3, the mounting member 92 is generally plate-like and includes an attachment portion 124 (See FIG. 4). The attachment portion 124 is an elongated opening 128 extending in a longitudinal direction of the second frame member 108 when the mounting member 92 is mounted to the first frame member 104. The elongation of the elongated opening 128 allows the vertical position of the derailleur 54 to be adjusted. As shown in FIGS. 3 and 4, the attachment portion 124 extends below the chain guide 112. Further, the attachment portion 124 is located on a front side of the most front end point of an outer plate of the chain guide 112 in a longitudinal direction of the bicycle 10. More preferably, the attachment portion 124 is located on a front side of a bearing (not shown in the drawings) to pivotally connect the connecting portion 80 and the second frame member in the longitudinal direction of the bicycle 10. In other words, the threaded hole 100 is located on a front side of the bearing. The shape of the attachment portion 124 is not limited to the elongated opening. Further, more than two openings, which are aligned in a direction of a longitudinal axis 58 of the second frame member 108, for example, can be the attachment portion.

The mounting member 92 further includes an elongated protrusion 132, which corresponds to the elongated recess 96. The protrusion 132 protrudes toward the center plane 56. The mounting member 92 forms a lower part of the derailleur 54, and the attachment portion 124 is located below the chain guide 112. A threaded fixing bolt 136 passes through the attachment portion 124 and engages the threads of the threaded hole 100 to fasten the mounting member 92 to the mounting seat 88 of the first frame member 104.

The elongated protrusion 132 provides an abutment 140 that abuts against the abutting portion 98 that is a part of the first frame member 104 if the derailleur 54 rotates about the fixing bolt 136. In other words, the abutment 140 prevents rotation of the mounting member 92 about the fixing bolt 136. The abutment 140 extends generally in the direction of a longitudinal axis 58 of the seat tube 26, which permits vertical adjustment of the position of the derailleur 54 when the derailleur 54 is attached to the first frame member 104 of the bicycle 10. The abutment 140 is configured to be located on a front side of the pivot axis 76 when the mounting member 92 is mounted to the first frame member 104. Preferably, the abutment 140 is configured to be located on the front side of the frontmost end point of the outer plate of the chain guide 112 in the longitudinal direction of the bicycle 10. Thus, in this embodiment, the abutment 140 is located between the frontmost end point of the outer plate of the chain guide 112 and the attachment portion 124 in the longitudinal direction of the bicycle 10. However, the abutment 140 can be located on the front side of the attachment portion 124, if needed or desired. Further, the abutment 140 can be located on the rear side of the pivot axis 76 in the longitudinal direction of the bicycle 10, if needed or desired.

Figure 5:
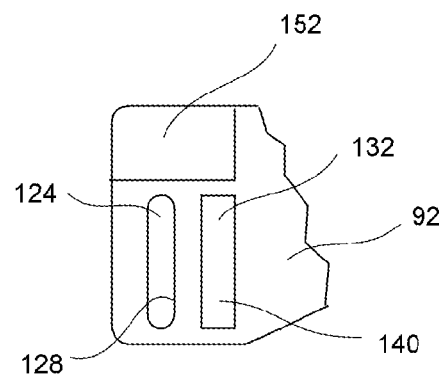
FIG. 5 is a partial rear view of a mounting member of the front derailleur.

Although the FIGS. 3-5 show an elongated protrusion 132 on the mounting member 92 and FIG. 2 shows an elongated recess 96 on the mounting seat 88, these parts can be reversed such that the elongated protrusion 132 is formed on the mounting seat 88 to protrude toward the mounting member 92, and the elongated recess 96 is formed on the mounting member 92 to face the mounting seat 88. Thus, the abutment 140 can be provided by one of the protrusion 132 or the elongated recess 96 formed on the mounting member 92, and the abutting portion 98 of the first frame member 104 can be provided by one of the elongated recess 96 or the protrusion 132 formed on the first frame member 104. Regardless of whether the abutment 140 is an elongated protrusion 132 or an elongated recess 96, the abutment 140 is integrally formed with the mounting member 92. In other words, the abutment is one of a protrusion 132 and an elongated recess 96, and the first frame member 104 includes the other of the protrusion 132 and the elongated recess 96. The protrusion 132 and the elongated recess 96 are configured to engage with one another, and the elongated recess 96 extends in a longitudinal direction of the second frame member 108 when the mounting member 92 is attached to the first frame member 104.

FIG. 4 shows the front derailleur 54 mounted on the first frame member 104 by the mounting member 92. In FIG. 4, the front of the bicycle 10 is on the right, and the rear of the bicycle 10 is on the left. The mounting member 92 includes a reinforcement portion 148, which is located on a rear side of the attachment portion 124. The reinforcement portion 148 strengthens the mounting member 92. The reinforcement portion 148 extends rearward of the attachment portion 124. Preferably, the reinforcement portion 148 extends downward of the chain guide 112. In the illustrated embodiments, at least part of the reinforcement portion 148 extends rearward of the pivot axis 76. The reinforcement portion 148 is formed without any portion that allows a fixing bolt passing through to fix the mounting member 92 to the first frame member 104. In other words, the mounting member 92 is fixed to the first frame member 104 only at the attachment portion 124, which is in front of the pivot axis 76.

FIGS. 3 and 5 show an upper projection 152 formed on the mounting member 92. The upper projection 152 includes a third surface 156 and a fourth surface 160. The upper projection 152 cooperates with the upper recess 102 of the mounting seat 88 when the derailleur 54 is mounted on the first frame member 104. The third surface 156 of the upper projection 152 faces the corresponding first surface 110 of the upper recess 102. The first surface 110 of the upper recess 102 serves to limit the downward movement of the front derailleur 54 with respect to the first frame member 104. The fourth surface 160 of the upper projection 152 faces the corresponding second surface 114 of the upper recess 102. The fourth surface 160 of the upper projection 152 can abut against the second surface of the upper recess to provide the front derailleur 54 with additional stability.

Referring to FIG. 2 the bicycle frame 22 includes a first frame member 104 and a second frame member 108, which is configured to be pivotally connected to the first frame member 104 about a pivot axis 76. The first frame member 104 includes a threaded hole 100 through which a fixing bolt 136 for fixing a mounting member 92 of a bicycle front derailleur 54 to the first frame member 104 passes. The first frame member 104 includes an abutting portion 98 configured to restrict rotation of the mounting member 92 around the fixing bolt 136 by abutting the mounting member 92 of the bicycle front derailleur 54. The threaded hole 100 is located on a front side of the pivot axis 76. Preferably, the first frame member 104 is a chain stay 30 of the bicycle frame 22, and the second frame member 108 is a seat tube 26 of the bicycle frame22, for example.

FIGS. 3-5 show the bicycle front derailleur 54, which includes a mounting member 92 configured to be mounted to a first frame member 104 of a bicycle frame 22. The first frame member 104 is pivotally connected to a second frame member 108 of the bicycle frame 22 about a pivot axis 76. The derailleur 54 further includes a chain guide 112 and a linkage assembly 116 that pivotally couples the mounting member 92 to the chain guide 112. The mounting member 92 includes an attachment portion 124 through which a fixing bolt 136 passes for fixing the mounting member 92 to the first frame member 104. The mounting member 92 further includes an abutment 140 configured to restrict rotation of the mounting member 92 around the fixing bolt 136 by abutting the first frame member 104. The attachment portion 124 is configured to be located on a front side of the pivot axis 76 when the mounting member 92 is mounted to the first frame member 104.

Figure 7:
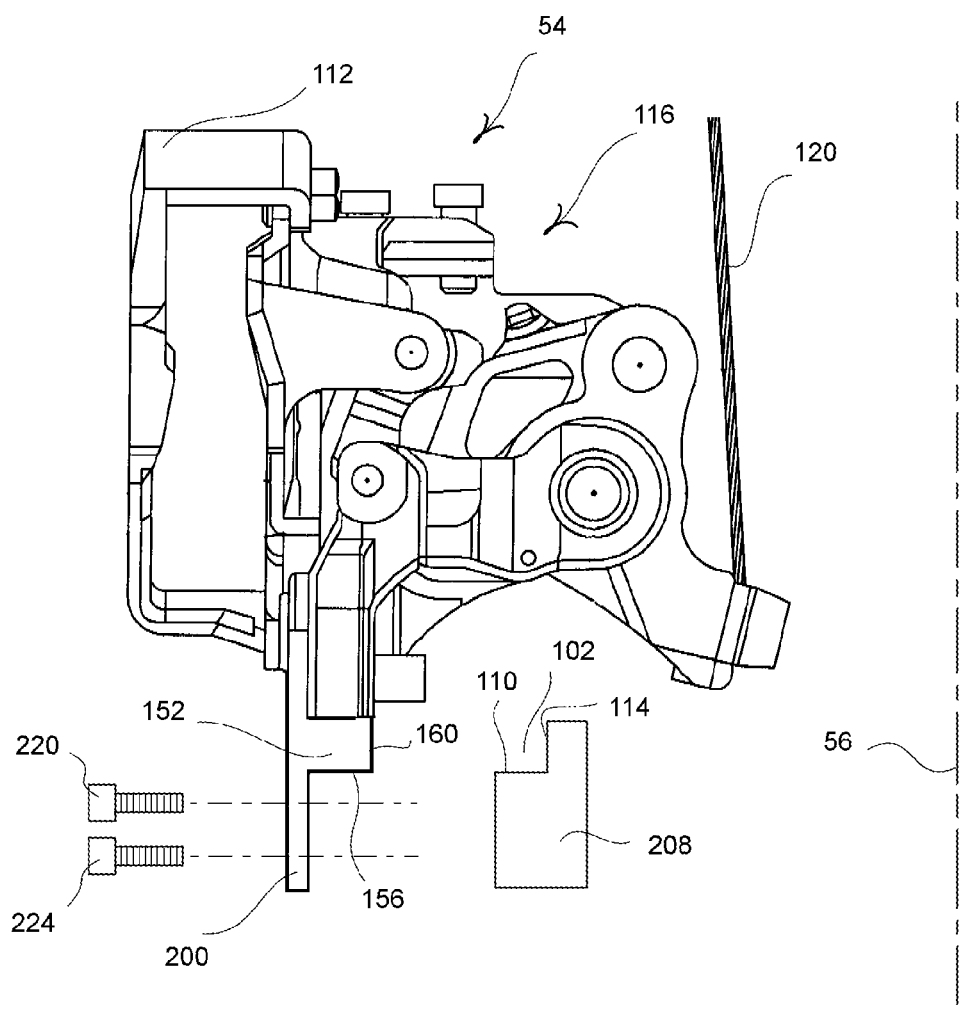
FIG. 7 is a front view of the front derailleur of the second embodiment.
Figure 8:
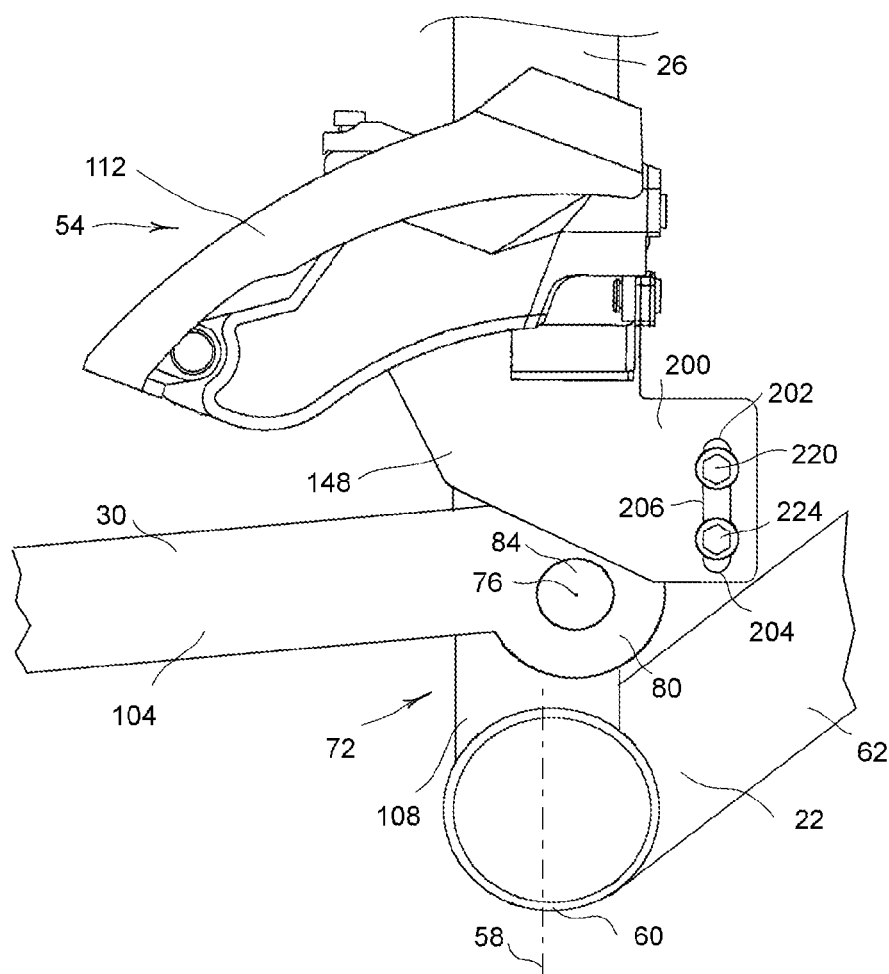
FIG. 8 is a diagrammatic side view of the front derailleur of the second embodiment and parts of the bicycle frame to which it is attached.
Figure 9:
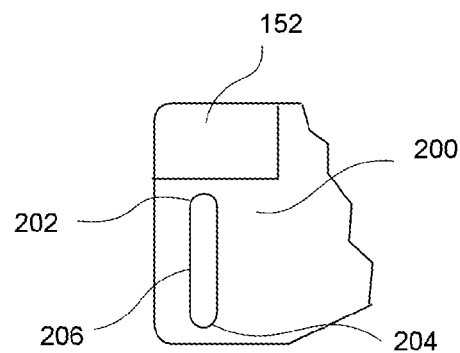
FIG. 9 is a partial rear view of a mounting member of the front derailleur.

In a second embodiment of the front derailleur 54, as shown in FIGS. 7-9, a mounting member 200 of the front derailleur 54 has an attachment portion 204 that includes an elongated opening 206 like that of the embodiment of FIGS. 3-5. However, the mounting member 200 lacks the elongated protrusion 132 of the embodiment of FIGS. 3-5. In the description of the second embodiment, parts that are the same or essentially the same as those of the first embodiment maybe designated by the reference numbers of the corresponding parts of the first embodiment.

Figure 6:
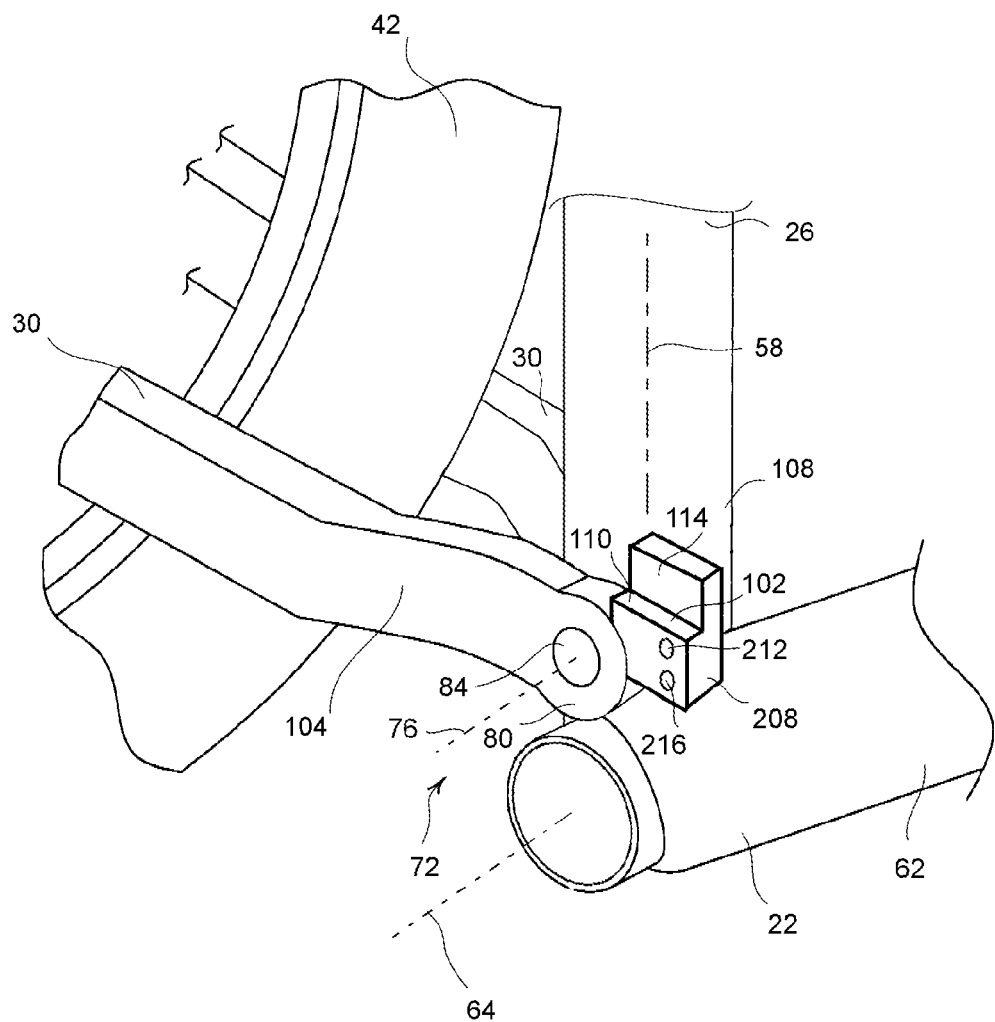
FIG. 6 is a partial diagrammatic perspective view of parts of the bicycle frame to which the front derailleur of a second embodiment of the present invention is attached.

FIG. 6 is like FIG. 2 except that FIG. 6 shows portions of the bicycle frame 22 in a second embodiment of the bicycle frame 22. FIG. 6 shows a mounting seat 208, which is formed on one of the connecting portions 80 of the first frame member 104. As in the first embodiment of FIGS. 3-5, the mounting seat 208 can be formed integrally with a connecting portion 80 of the first frame member 104 or attached separately by a fastener or by welding. The mounting seat 208 is designed so that the mounting member 200 of the front derailleur 54 is attached to the mounting seat 208.

The mounting seat 208 of FIG. 6 to which the mounting member 200 of the second embodiment is attached differs slightly from the mounting seat 88 of FIG. 2. The mounting seat 208 includes a first threaded hole 212 and a second threaded hole 216, which are spaced apart in the general direction of the axis 58 of the seat tube. The mounting seat 208 also includes the upper recess 102, which is essentially the same as that of the embodiment of FIGS. 3-5. In the second embodiment, both the first threaded hole 212 and the second threaded hole 216 are located in front of the pivot axis 76. Preferably, both the first threaded hole 212 and the second threaded hole 216 are located on a front side of the bearing (not shown in the drawings) to pivotally connect the connecting portion 80 and the second frame member 108 in the longitudinal direction of the bicycle 10.

FIG. 7 shows the front derailleur 54 of the second embodiment in alignment with the mounting seat 208 of the first frame member 104. FIG. 8 shows the front derailleur 54 mounted on the first frame member 104 by the mounting member 200 of the second embodiment. As shown in FIGS. 8 and 9, the elongated opening 206 forms a first attachment portion 202 and a second attachment portion 204. In this embodiment, a first fixing bolt 220 and a second fixing bolt 224 pass through the first attachment portion 202 and the second attachment portion 204, respectively, to fasten the front derailleur 54 to the first frame member 104. The first fixing bolt 220 and the second fixing bolt 224 are threaded, and the threads of the first and second fixing bolts 220, 224 engage the threads of the first and second threaded bores 212, 216, respectively, to secure the mounting member 200 to the first frame member 104. Although the first attachment portion 202 and the second attachment portion 204 are formed by a single elongated opening 206 in the embodiment of FIGS. 7-9, the first and second attachment portions 202, 204 can be formed by two separate elongated openings that are spaced apart in the direction of the axis 58 of the seat tube 26. The position of the elongated opening 206 relative to the first and second threaded bores 212, 216 is adjusted in a direction parallel to the center axis 58 when the mounting member 200 is mounted to the first frame member 104.

Like the mounting member 92 of the first embodiment, the mounting member 200 of the second embodiment includes the upper projection 152, which cooperates with the upper recess 102 in the manner described in connection with the first embodiment.

Thus, FIG. 6 shows a bicycle frame including a second frame member 108 and a first frame member 104 configured to be pivotally connected to the second frame member 108 about a pivot axis 76. The second frame member 108 includes a bottom bracket hanger 60 to which a bottom bracket 32 is attached. The first frame member 104 includes a first threaded hole 212 through which a first fixing bolt 220 for fixing a mounting member 200 of a bicycle front derailleur 54 to the first frame member 104 passes and includes second threaded hole 216 through which a second fixing bolt 224 for fixing the mounting member 200 of the bicycle front derailleur 54 to the first frame member 104 passes. The first and second threaded holes 212, 216 are located on a front side of the pivot axis 76. Preferably, the first frame member 104 is a chain stay 30 of the bicycle frame 22, and the second frame member 108 is a seat tube 26 of the bicycle frame 22, for example.

FIGS. 7-9 show a bicycle front derailleur including a mounting member 200 configured to be mounted to a first frame member 104 of a bicycle frame 22. The first frame member 104 is pivotally connected to the second frame member 108 of the bicycle frame 22 about a pivot axis 76. The second frame member 108 includes a bottom bracket hanger 60, to which a bottom bracket 32 is attached. The front derailleur 54 further includes a chain guide 112 and a linkage assembly 116 that pivotally couples the mounting member 200 to the chain guide 112. The mounting member 200 includes a first attachment portion 202 through which a first fixing bolt 220 for fixing the mounting member 200 to the first frame member 104 passes and includes a second attachment portion 204 through which a second fixing bolt 224 for fixing the mounting member 200 to the first frame member 104 passes. The first and second fixing bolts 220, 224 are configured to be located on a front side of the pivot axis 76, when the mounting member 200 is mounted to the first frame member 104.

Figure 10:
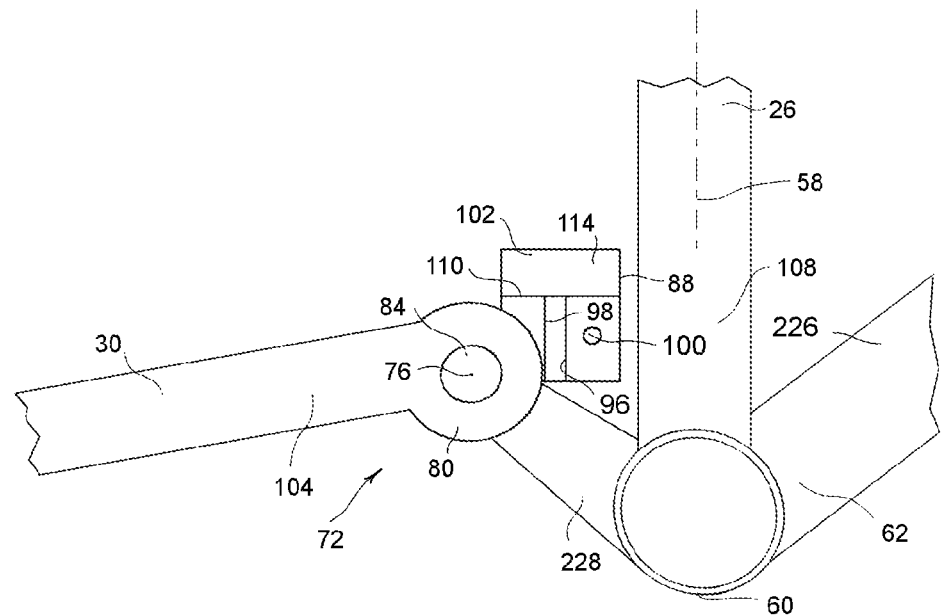
FIG. 10 is a diagrammatic side view of a bicycle frame configured to support a front derailleur of a third embodiment.
Figure 11:
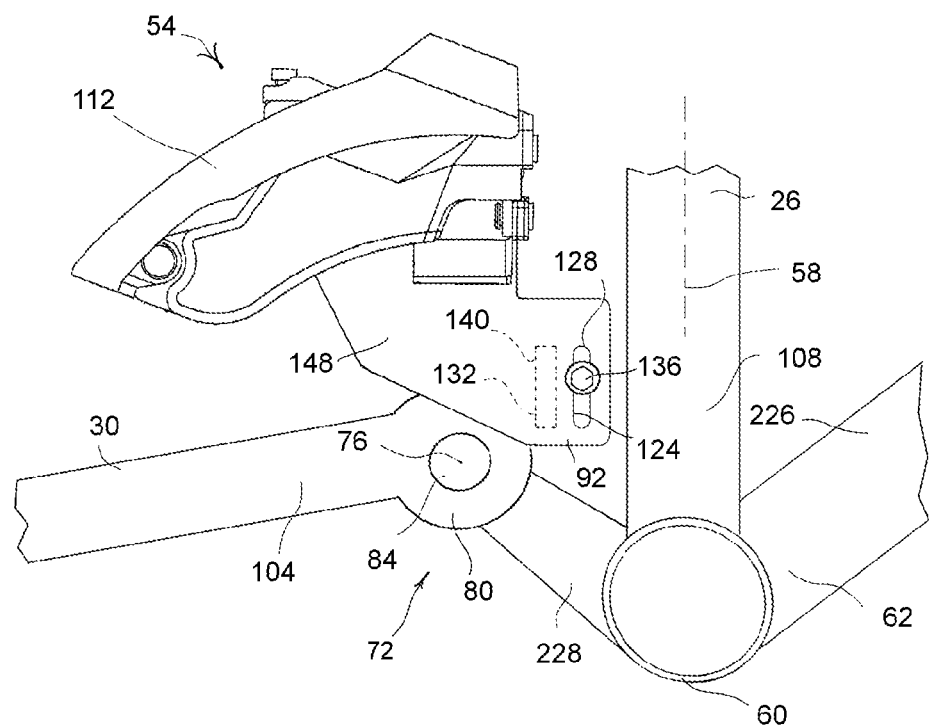
FIG. 11 is a diagrammatic side view of the front derailleur and parts of the bicycle frame to which it is attached in the third embodiment.

FIGS. 10 and 11 show a third embodiment of the front derailleur 54. In the description of the third embodiment, parts that are the same or essentially the same as those of the first embodiment may be designated by the reference numbers of the corresponding parts of the first embodiment.

The third embodiment of FIGS. 10 and 11 is similar to the first embodiment of FIGS. 2-5 except that a frame 22 includes a support member 228 extending upward and rearward from the bottom bracket hanger 60. The pivot joint 72 is located at an end of the support member 228 as shown, for example. The pivot pin 84 is fixed securely to the support member 228 by welding or other secure fastening method. The third embodiment illustrates that, the pivot joint 72 is not necessarily fixed directly to the second frame member 108 but can be indirectly fixed to the second frame member 108. The angle and position of the support member 228 can be varied from that shown in FIGS. 10 and 11 according to the particular frame configuration desired.

While the invention has been described in detail with respect to specific embodiments, those skilled in the art, upon attaining an understanding of the specific embodiments, may readily conceive of alterations, variations, and equivalents to these embodiments. Accordingly, the scope of the invention should be assessed as that of the appended claims and their equivalents.

What is claimed is:

1. A bicycle front derailleur comprising:
a mounting member configured to be mounted to a first frame member of a bicycle frame, the first frame member being pivotally connected to a second frame member of the bicycle frame about a pivot axis, so that the first frame member is pivotal with respect to the second frame member about the pivot axis;
a chain guide; and
a linkage assembly that pivotally couples the mounting member to the chain guide, wherein
the mounting member includes an attachment portion, and the attachment portion includes an opening through which a fixing bolt for fixing the mounting member to the first frame member passes and includes an abutment configured to restrict rotation of the mounting member around the fixing bolt by abutting the first frame member,
the opening is configured to be located on a front side of the pivot axis, which is a side of the pivot axis that corresponds to a front end of the bicycle frame, when the mounting member is mounted to the first frame member.

2. The bicycle front derailleur according to claim 1, wherein the abutment is integrally formed with the mounting member.

3. The bicycle front derailleur according to claim 1, wherein the first frame member is a chain stay of the bicycle frame, and the second frame member is a seat tube of the bicycle frame.

4. The bicycle front derailleur according to claim 1, wherein the attachment portion is an elongated opening extending in a longitudinal direction of the second frame member when the mounting member is mounted to the first frame member.

5. The bicycle front derailleur according to claim 1, wherein the abutment is configured to be located on the front side of the pivot axis when the mounting member is mounted to the first frame member.

6. The bicycle front derailleur according to claim 1, wherein the mounting member is configured to be mounted to a connecting portion of the first frame member.

7. The bicycle front derailleur according to claim 1, wherein the mounting member includes a reinforcement portion, which is located on a rear side of the attachment portion.

8. The bicycle front derailleur according to claim 1, wherein the attachment portion extends below the chain guide.

9. A bicycle front derailleur comprising:
a mounting member configured to be mounted to a first frame member of a bicycle frame, wherein the first frame member is pivotally connected to a second frame member of the bicycle frame about a pivot axis, so that the first frame member is pivotal with respect to the second frame member about the pivot axis, and the second frame member includes a bottom bracket hanger to which a bottom bracket is attached;
a chain guide;
a linkage assembly that pivotally couples the mounting member to the chain guide, wherein
the mounting member includes a first attachment portion through which a first fixing bolt for fixing the mounting member to the first frame member passes and includes a second attachment portion through which a second fixing bolt for fixing the mounting member to the first frame member passes, and
the first and second fixing bolts are configured to be located on a front side of the pivot axis, which is a side of the pivot axis that corresponds to a front end of the bicycle frame, when the mounting member is mounted to the first frame member.

10. A bicycle front derailleur comprising:
a mounting member configured to be mounted to a first frame member of a bicycle frame, the first frame member being pivotally connected to a second frame member of the bicycle frame about a pivot axis, so that the first frame member is pivotal with respect to the second frame member about the pivot axis;
a chain guide; and
a linkage assembly that pivotally couples the mounting member to the chain guide, wherein
the mounting member includes an attachment portion through which a fixing bolt for fixing the mounting member to the first frame member passes and includes an abutment configured to restrict rotation of the mounting member around the fixing bolt by abutting the first frame member,
the attachment portion is configured to be located on a front side of the pivot axis, which is a side of the pivot axis that corresponds to a front end of the bicycle frame, when the mounting member is mounted to the first frame member, wherein the attachment portion is an elongated opening extending in a longitudinal direction of the second frame member when the mounting member is mounted to the first frame member,
the abutment is one of a protrusion and an elongated recess,
the first frame member includes the other of the protrusion and the elongated recess,
the protrusion and the elongated recess are configured to engage with one another, and
the elongated recess extends in a longitudinal direction of the second frame member when the mounting member is attached to the first frame member.

11. A bicycle front derailleur comprising:
a mounting member configured to be mounted to a first frame member of a bicycle frame, the first frame member being pivotally connected to a second frame member of the bicycle frame about a pivot axis, so that the first frame member is pivotal with respect to the second frame member about the pivot axis, wherein the mounting member includes a reinforcement portion, which is located on a rear side of the attachment portion;
a chain guide; and
a linkage assembly that pivotally couples the mounting member to the chain guide, wherein
the mounting member includes an attachment portion through which a fixing bolt for fixing the mounting member to the first frame member passes and includes an abutment configured to restrict rotation of the mounting member around the fixing bolt by abutting the first frame member,
the attachment portion is configured to be located on a front side of the pivot axis, which is a side of the pivot axis that corresponds to a front end of the bicycle frame, when the mounting member is mounted to the first frame member, and
the reinforcement portion is formed without any portion that allows a fixing bolt passing through to fix the mounting member to the first frame member.

* * * * *